United States Patent [19]

Matsuda et al.

[11] Patent Number: 5,230,403
[45] Date of Patent: Jul. 27, 1993

[54] STEERING PLATFORM FOR A WORKING VEHICLE

[75] Inventors: Kenji Matsuda; Osami Fujiwara; Hironori Tsuchihashi; Jinnosuke Takakura, all of Sakai, Japan

[73] Assignee: Kubota Corporation, Osaka, Japan

[21] Appl. No.: 800,194

[22] Filed: Nov. 27, 1991

[30] Foreign Application Priority Data

Nov. 30, 1990 [JP] Japan ................. 2-340688

[51] Int. Cl.⁵ ............... A01D 34/00; B62D 25/22
[52] U.S. Cl. ................... 180/315; 180/90.6; 180/900
[58] Field of Search ............ 180/90.6, 315, 335, 180/336, 900; 280/291; 56/14.7

[56] References Cited

U.S. PATENT DOCUMENTS

| | | | |
|---|---|---|---|
| 2,792,898 | 5/1957 | Mast | 56/14.7 |
| 4,620,575 | 11/1986 | Cuba et al. | |
| 4,759,417 | 7/1988 | Wanie et al. | |
| 4,969,319 | 11/1990 | Hutchison | 56/14.7 |
| 5,048,638 | 9/1991 | Duncan et al. | 180/336 |

FOREIGN PATENT DOCUMENTS 482183 9/1929 Fed. Rep. of Germany ...... 180/315

Primary Examiner—Karin L. Tyson
Attorney, Agent, or Firm—Jordan and Hamburg

[57] ABSTRACT

A steering platform includes a main floor supported by a body framework extending longitudinally of a vehicle, and footrests extending from the main floor laterally outwardly of the framework. A brake pedal and a shift pedal are arranged on the footrests. The framework in a steering platform region supports cross shafts extending transversely through the framework. These shafts include a brake control shaft for pivotally supporting a brake lever, and a shaft for driving a raising and lowering link mechanism of a grass cutting unit. The cross shafts include outward extensions for supporting the footrests through brackets, respectively.

13 Claims, 3 Drawing Sheets

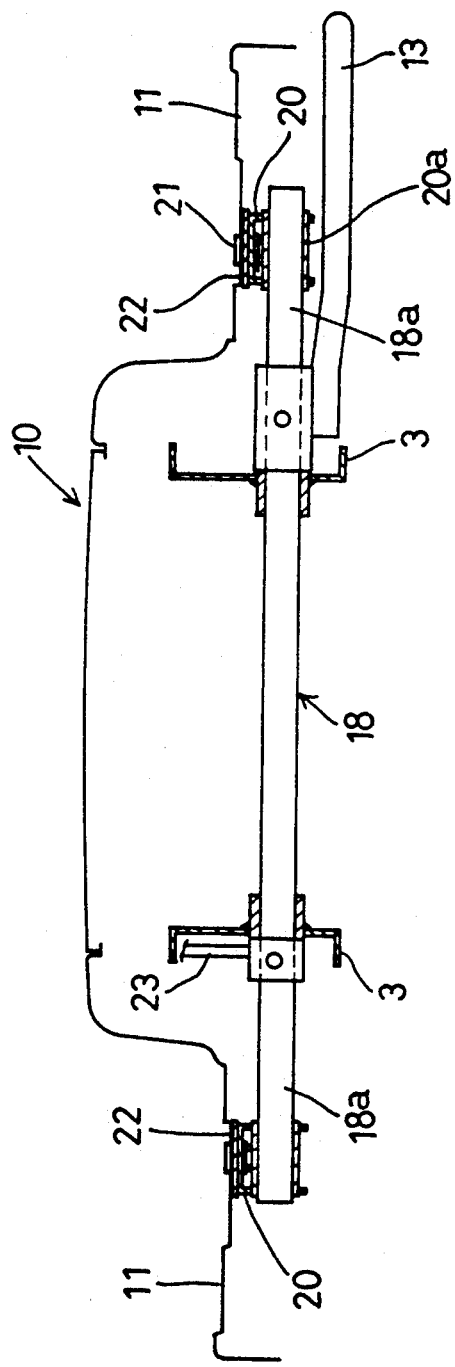
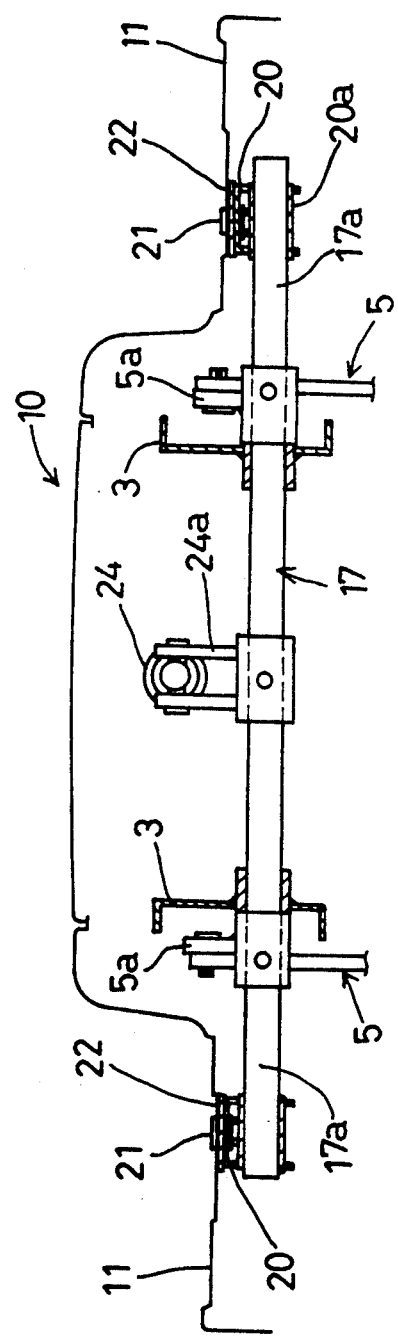

STEERING PLATFORM FOR A WORKING VEHICLE

BACKGROUND OF THE INVENTION

1. FIELD OF THE INVENTION

The present invention relates to a steering platform for use on a small working vehicle such as a riding lawn mower or a riding agricultural machine.

2. Background of The Invention

A conventional working vehicle, as disclosed in U.S. Pat. No. 4,759,417, for example, has a steering column erected in a front position, and a brake pedal and a gear shift pedal for backward and forward running arranged at opposite sides of the steering column. The vehicle includes a wide framework to provide a main floor for supporting the steering column, and footrests for supporting the driver's feet which operate the different pedals. This frame structure, because of its large width, requires a considerable thickness for strength. Where such a steering platform structure is employed on a front-mount type lawn mower, the framework must be set to a high level for a grass cutting unit to be vertically movable by a large amount. This results in an increased height over the ground of the entire steering platform, reducing stability of the vehicle. Conversely, if the steering platform is set to a low level, the grass cutting unit has a reduced space for vertical movement due to obstruction presented by bottom parts of the framework.

In a tractor as disclosed in U.S. Pat. No. 4,620,575 in which a grass cutting unit may be mounted in an intermediate position thereof, a steering platform is composed of a main floor defined by a framework extending through the center of the tractor, and footrests attached through brackets or the like to side walls of the framework. In such a construction, the footrest mounting brackets must have a relatively large vertical span for attachment to the side walls of the framework in order to secure sufficient rigidity. As a result, lower ends of the brackets can be obstructive to attachment of the grass cutting unit and a space for its vertical movement.

SUMMARY OF THE INVENTION

The object of the present invention object is to provide an improved steering platform with footrests having a relatively small thickness and supported with sufficient strength.

The above object is fulfilled, according to the present invention, by a steering platform comprising a main floor supported by a body framework, and footrests supported by extensions of a control shaft supported by the framework and interlocked with a control device.

According to the above construction, the extensions of the control shaft firmly supported by the body framework, as they are, act as supports for the footrests. Consequently, the footrests, although simple and thin in structure, are supported with sufficient strength. Even if the body framework is set to a low position so that the footrests have a reduced height over the ground, a sufficiently large space is secured between bottoms of the footrests and a working implement such as a grass cutting unit suspended from the body framework.

Other features and advantages of the present invention will be apparent from the following description of a preferred embodiment to be had with reference to the drawings.

BRIEF DESCRIPTION OF THE DRAWINGS

FIG. 4 is a front view seen in the direction of arrow A in FIG. 1 and showing a support structure for a brake control shaft and footrests, and FIG. 5 is a front view seen in the direction of arrow B in FIG. 1 and showing a support structure for a lift arm support shaft and the footrests.

DETAILED DESCRIPTION OF THE PREFERRED EMBODIMENT

Figure 1:
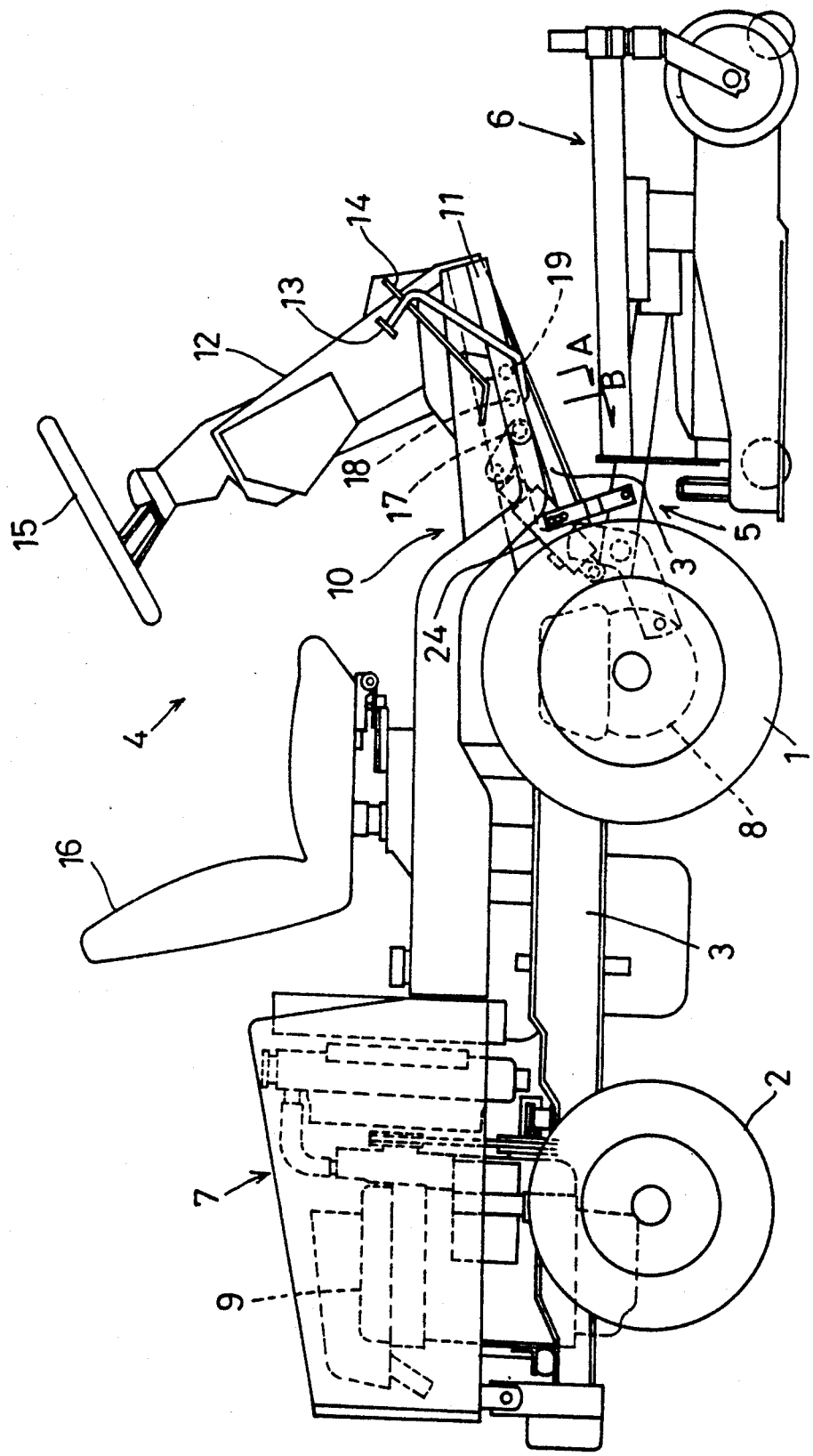
FIG. 1 is a side elevation of a front-mount type riding lawn mower employing a steering platform according to the present invention.
Figure 2:
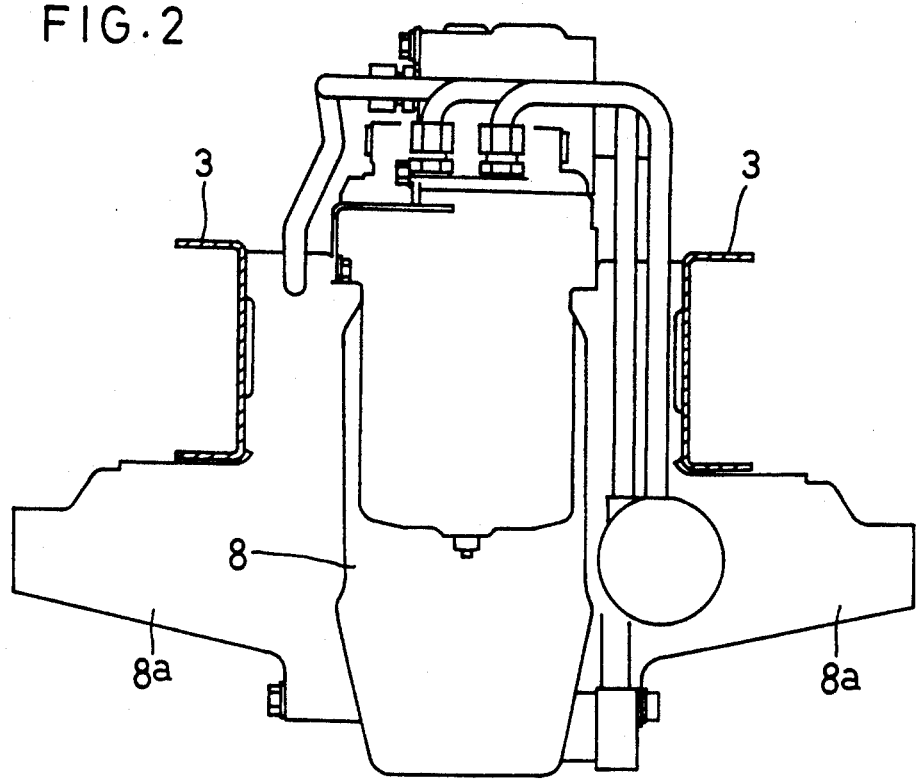
FIG. 2 is a front view of a transmission case disposed between body frames.

FIG. 1 shows a front-mount type riding lawn mower employing a steering platform according to the present invention. This lawn mower has right and left front wheels 1 and rear wheels 2 supporting a pair of right and left body frames 3 extending longitudinally of the mower, with a driver's section 4 provided in a front region of the body frames 3. A grass cutting unit 6 is disposed below the driver's section 4, which is suspended from the frames 3 to be vertically movable through a link mechanism 5. A motor section 7 is provided in a rearward region of the body frames 3. The motor section 7 includes an engine 9 mounted between the body frames 3 as seen from FIG. 2. A front wheel drive transmission case 8 is also mounted between the body frames 3. Only a front axle case 8a extending from the transmission case 8 projects outwardly from under the frames 3.

The driver's section 4 includes a main floor 10 supported by the body frames 3 and extending fore and aft through the center of the vehicle, a steering column 12 erected in a front end region of the main floor 10, footrests 11 extending sideways from the main floor 10, and a brake pedal 13 and a shift pedal 14 operably by the driver's feet placed on the footrests 11. The steering column 12 has a steering wheel 15 at the top, and a driver's seat 16 is disposed rearwardly of the steering column 12.

In this embodiment, the steering platform is a plate structure including a portion of the main floor 10 adjacent the steering column 12, and the footrests 11 extending sideways from the main floor 10. The steering platform may of course have a perforated metal structure. Next, a support structure for this steering platform will be described.

Figure 3:
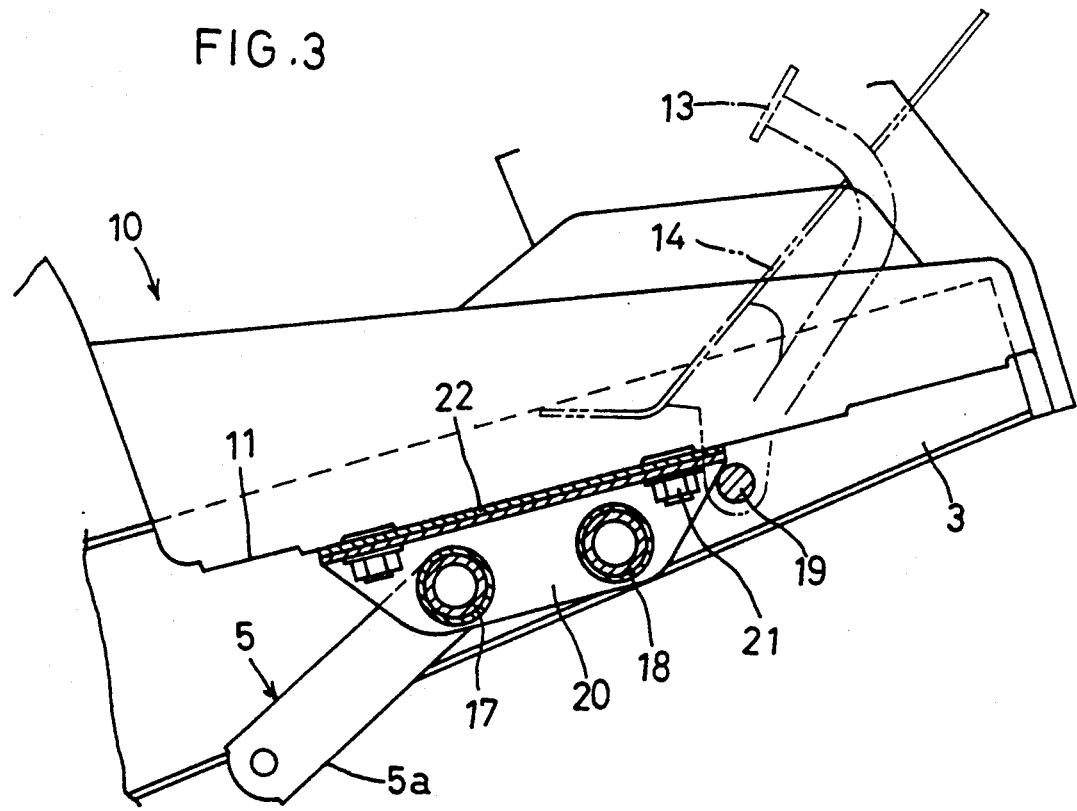
FIG. 3 is an enlarged side view of a footrest.

As shown in FIGS. 3 through 5, forward portions of the body frames 3, i.e. regions thereof supporting the driver's section 4, include a link control shaft 17, a brake control shaft 18 and a speed control shaft 19 extending transversely through the right and left frames 3. The link control shaft 17 pivotally supports one end of a lift arm 5a acting as part of the link mechanism 5 of the grass cutting unit 6. The brake control shaft 18 pivotally supports the brake pedal 13, while the speed control shaft 19 pivotally supports the shift pedal 14. Of these cross shafts in this embodiment, the link control shaft 17 and brake control shaft 18 include extensions 17a and 18a at opposite ends thereof, respectively, which penetrate lower positions of the channel-shaped body frames 3 and project outwardly therefrom. As seen from FIGS. 4 and 5, brackets 20 are mounted on the extensions 17a and 18a for supporting the footrests 11 from below, which footrests 11 extend downwardly and then horizontally outwardly from the main floor 10. The footrests 11 are connected to flat upper surfaces of the brackets 20 by bolts 21 and through rubber cushions 22. Thus, the footrests 11 are reliably supported by a simple structure. With this supporting structure, the footrests 11 have foot-supporting surfaces in a lower level than a top surface of the main floor 10 to provide increased freedom for the driver's feet, without any components projecting below lower ends of the body frames 3.

Of course, the speed control shaft 19 may also include similar extensions to contribute to the footrest supporting function as necessary. Where there is no possibility of a great load, only one of these cross shafts may include extensions for supporting the footrests 11.

In this embodiment, the brackets 20 include bushes 20a to permit rotation of the brake control shaft 18 and link control shaft 17. Where these shafts are not rotatable, the brackets 20 may be constructed to clamp the shafts directly.

Numeral 23 in FIG. 4 denotes an interlocking arm fixed to the brake control shaft 18 and interlocked through a rod to a brake not shown. Numeral 24 in FIG. 5 denotes a hydraulic cylinder for turning the link control shaft 17 to drive the link mechanism 5. The cylinder 24 and link control shaft 17 are interconnected through a cylinder arm 24a.

What is claimed is:

1. A steering platform for a working vehicle having various control devices, comprising:
    a framework extending longitudinally of said working vehicle;
    a main floor supported by said framework;
    a control shaft supported by said framework and interlocked with at least one of said control devices, said control shaft having extensions penetrating and projecting outwardly from said framework;
    footrests extending from said main floor laterally outwardly of said framework and fixed with respect thereto; and
    brackets supported by said extensions, said footrests being supported by said extensions via said brackets.

2. A steering platform for a working vehicle having various control devices, comprising:
    a framework extending longitudinally of said working vehicle;
    a main floor supported by said framework;
    a first control shaft supported by said framework and interlocked with at least one of said control devices, said first control shaft having first extensions penetrating and projecting outwardly from said framework;
    footrests extending from said main floor laterally outwardly of said framework;
    a second control shaft supported by said framework and interlocked with a different one of said control devices, said second control shaft having second extensions projecting outwardly from said framework;
    brackets supported by both said first extensions and said second extensions;
    said footrests being supported via said brackets.

3. A steering platform for a front-mount lawn mower having a grass cutting unit disposed below a front framework, and a steering wheel and a control section disposed above said front framework, said platform comprising:
    a main floor supported by said front framework;
    a steering column erected centrally of said main floor;
    footrests disposed at least in regions at opposite sides of said steering column and extending from said main floor laterally outwardly of said framework, said footrests being fixed with respect to said main floor;
    a first control shaft supported by said framework and interlocked with said control section, said first control shaft having extensions penetrating and projecting outwardly from said framework; and
    brackets supported by said extensions, said footrests being supported by said extensions via said brackets.

4. A steering platform for a front-mount lawn mower having a grass cutting unit disposed below a front framework, and a steering wheel and a control section disposed above said front framework, said platform comprising:
    a main floor supported by said front framework;
    a steering column erected centrally of said main floor;
    footrests disposed at least in regions at opposite sides of said steering column and extending from said main floor laterally outwardly of said framework;
    a first control shaft supported by said framework and interlocked with said control section, said first control shaft having first extensions penetrating and projecting outwardly from said framework;
    a second control shaft supported by said framework and including second extensions similar to the first extensions of said first control shaft,
    and brackets supported by both said first extensions and said second extensions;
    said footrests being supported via said brackets.

5. A steering platform as claimed in claim 4, wherein said first control shaft is a brake control shaft, and said second control shaft is a link pivot shaft for a link mechanism for vertically moving said grass cutting unit.

6. A steering platform as claimed in claim 5, wherein said brackets include bushes for rotatably supporting said first and second control shafts, respectively.

7. A steering platform as claimed in claim 1, wherein said brackets are connected to said footrests through elastic elements.

8. A steering platform as claimed in claim 1, wherein said footrests are plates.

9. A steering platform as claimed in claim 8, wherein said footrests define foot supporting surfaces positioned at a lower level than said main floor.

10. A steering platform as claimed in claim 1 further comprising an operating pedal operatively coupled to rotate said control shaft.

11. A steering platform as claimed in claim 1 wherein said footrests are provided on each side of said vehicle and are connected to said main floor.

12. A steering platform as claimed in claim 3 further comprising an operating pedal operatively coupled to rotate said control shaft.

13. A steering platform as claimed in claim 3 wherein said footrests are provided on each side of said vehicle and are connected to said main floor.

* * * * *